United States Patent [19]

Kuras et al.

[11] Patent Number: 5,698,316

[45] Date of Patent: Dec. 16, 1997

[54] APPARATUS AND METHODS OF PROVIDING CORROSION RESISTANT CONDUCTIVE PATH ACROSS NON CONDUCTIVE JOINTS OR GAPS

[75] Inventors: John Charles Kuras, Everett, Wash.; Nadine McClam-Brown, Wyncote, Pa.

[73] Assignee: The Boeing Company, Seattle, Wash.

[21] Appl. No.: 726,041

[22] Filed: Oct. 7, 1996

[51] Int. Cl.$^6$ .................. B32B 7/12; B32B 15/08; B64C 1/06; B64C 1/12

[52] U.S. Cl. .................. 428/344; 428/33; 428/458; 428/475.2; 244/1 A; 244/131; 244/132; 361/218

[58] Field of Search .................. 428/33, 236, 237, 428/240, 247, 256, 285, 295, 344, 458, 475.2; 244/1 A, 131, 132; 361/218

[56] References Cited

U.S. PATENT DOCUMENTS

| | | | |
|---|---|---|---|
| 3,431,348 | 3/1969 | Nellis et al. | 219/10.55 |
| 3,755,713 | 8/1973 | Paszkowski | 317/2 E |
| 3,885,071 | 5/1975 | Blad et al. | 428/60 |
| 4,015,035 | 3/1977 | Blad et al. | 428/60 |
| 4,313,777 | 2/1982 | Buckley et al. | 156/272 |
| 4,671,470 | 6/1987 | Jonas | 244/119 |
| 4,746,389 | 5/1988 | DiGenova | 156/247 |
| 5,065,960 | 11/1991 | Castellucci | 244/131 |
| 5,127,601 | 7/1992 | Schroeder | 244/1 A |
| 5,250,342 | 10/1993 | Lang et al. | 428/138 |
| 5,312,508 | 5/1994 | Chisholm | 156/292 |
| 5,352,565 | 10/1994 | Schroeder | 430/320 |
| 5,370,921 | 12/1994 | Cedarleaf | 428/138 |
| 5,473,111 | 12/1995 | Hattori et al. | 174/35 R |

*Primary Examiner*—Cathy F. Lam
*Attorney, Agent, or Firm*—Robert H. Sproule

[57] ABSTRACT

An electrically conductive bridge is formed over a non conductive joint between two or more adjacent electrically conductive panels. The bridge provides a continuous conductive path between the panels. In an exemplary embodiment, the panels form part of a shield against electromagnetic and/or lightning strike energy. The bridge is formed by taping an expanded conductive mesh over exposed conductive portions of the panels and applying an epoxy adhesive. During a following cure cycle, vacuum compression is applied. The expanded mesh of the bridge has an out-of-plane cross sectional configuration which remains in contact with the panel conductive portions during cure so that when the adhesive has cured, the bridge mesh and the panel conductive portions are held in contact with each other.

4 Claims, 5 Drawing Sheets

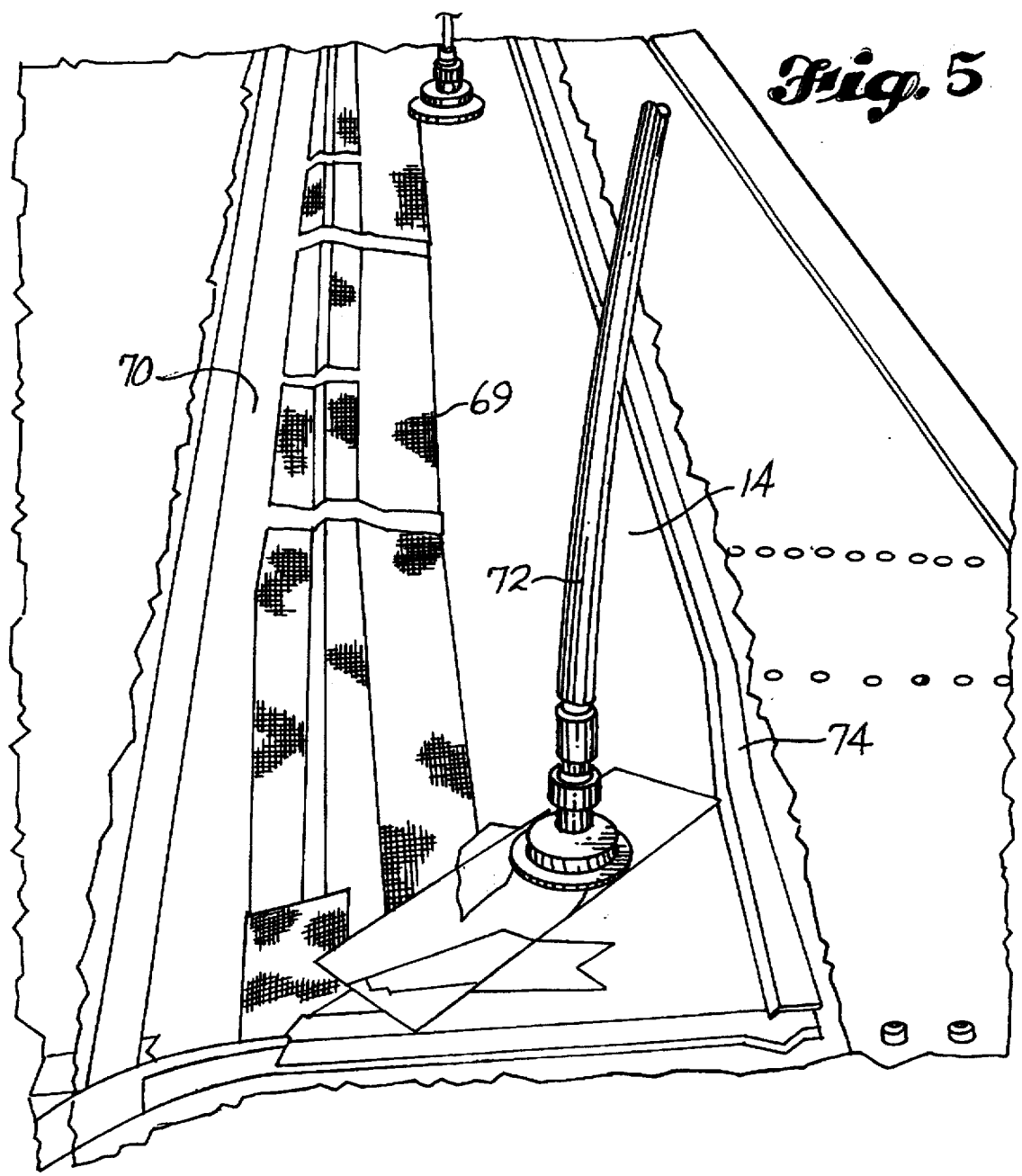

APPARATUS AND METHODS OF PROVIDING CORROSION RESISTANT CONDUCTIVE PATH ACROSS NON CONDUCTIVE JOINTS OR GAPS

This invention was made with Government support under [N00019-93-C-006] N00019-93-C-0006 awarded by the Department of the Navy. The Government has certain rights in this invention.

TECHNICAL FIELD

The present invention relates to apparatus and methods of providing an electrically conductive path across a joint or gap between two or more adjacent parts in order to provide a continuous conductive path therebetween.

BACKGROUND OF THE INVENTION

It is often useful to provide a continuous conductive path between adjacent parts which are themselves electrically conductive but which are separated by a non conductive joint or gap.

For example, it is important that electronic components on an aircraft be shielded from the effects of external electromagnetic fields and from the effects of lightning strikes. External electromagnetic fields, referred to as EMI effects, can disrupt the operation of on board electronic components by generating unwanted voltage and current fluctuations in the wiring. These fluctuations can also permanently damage the electronic components.

During a lightning strike the electronic components can be subjected to extremely high voltages and currents which can seriously impair their operation as well as result in permanent damage. In order to avoid this problem, these components must be shielded from the effects of the lightning strikes as well.

A common method of mitigating the potential damage from EMI effects and lightning is to place a continuous conductive shield around the electronic components which are at risk. Often the outer surface or "skin" of the aircraft is used as such a shield.

Often aircraft skins are made from composite materials which are poor conductors and therefore are not good shields against EMI effects and lightning. A common solution to this problem is to add a metallic conductive layer or wire mesh as part of the composite skin panel to act as a conductor. Although this produces a panel which is electrically conductive, it does not solve the problem of providing for a continuous conductive path between adjacent conductive panels.

Another reason for providing a continuous conductive path between adjacent parts applies to the performance of high frequency antennas. On some aircraft, the aircraft skin is utilized as a high frequency antenna. In order for this antenna to operate efficiently, conductive paths between individual conductive panels of the aircraft skin are necessary.

A number of approaches have been tried to achieve conductivity between such composite panels.

For example, one suggested method has been to use conductive fasteners to attach the panels to the underlying frame of the aircraft so that a path of conductivity is provided through the fasteners and frame to the adjacent panels.

An additional problem related to the use of composite materials is galvanic corrosion. This problem arises when two dissimilar parts, such as a composite skin and an aluminum frame, are joined together. A solution to this problem has been to provide an electrical insulator at the junction of these dissimilar materials. This reduces the conductivity between the dissimilar materials sufficiently so that the galvanic corrosion is no longer a problem. However, the need to protect such components from corrosion is sometimes incompatible with the need for electrically conductivity therebetween to obtain electromagnetic and/or lightning shielding. More specifically, the use of insulators to prevent galvanic corrosion eliminates the required conductivity between panels that is essential to EMI and lightning protection.

A number of other conventional EMI shields have been disclosed. For example, U.S. Pat. No. 5,250,342 by Lang et al discloses a composite EMI shield having an embedded aluminum wire mesh which is fabricated using nonporous tape so that upon removal of the tape there are provided clean conductive areas on either side of the shield for conductive mating with adjoining parts using metal straps, bolts or gaskets.

Other relevant patents include U.S. Pat. No. 5,127,601 and U.S. Pat. No. 5,352,565, both by Schroeder, which disclose an airplane lightning shield consisting of thin metallic foil which is bonded to a composite surface using an epoxy or adhesive.

In U.S. Pat. No. 4,313,777 by Buckley et al there is disclosed a one step method of inductively heating two sheets of thermoplastic material and simultaneously fixing electronic circuitry into the thermoplastic material.

U.S. Pat. No. 3,431,348 by Watchung et al discloses a viewing laminate containing an embedded wire screen which extends beyond the periphery thereof to provide electrical contact with an exterior conductor.

U.S. Pat. No. 5,473,111 by Hattori discloses an electronics enclosure made of molded resin and having EMI shielding which is molded integrally with the resin.

In U.S. Pat. No. 4,746,389 by DiCenova there is disclosed a composite EMI shield having an embedded aluminum wire mesh wherein the shield is fabricated using nonporous tape so that when the tape is removed, there are exposed clean conductive areas for providing a conductive path with adjacent articles.

In U.S. Pat. No. 5,065,960 by Castellucci there is disclosed a gap filler which is located between a gap formed between adjacent metallic aircraft panels to improve laminar flow and which is formed of an electrically conductive material to prevent galvanic corrosion between the panels.

U.S. Pat. No. 4,015,035 and U.S. Pat. No. 3,885,071, both by Blad et al, disclose an apparatus and method of joining epoxy composite articles whereby fibers of each of the composite articles pass through and are intermeshed across a joint bond line.

U.S. Pat. No. 5,370,921 by Cedarleaf discloses a composite structure containing a conductive metallic wire screen or foil layer.

U.S. Pat. No. 5,312,508 by Chisholm discloses a method for attaching wire mesh heat sinks to electronic packages for heat transfer purposes wherein the adhesive is displaced from the areas between the wire mesh and the semiconductor.

In U.S. Pat. No. 3,755,713 by Paszkowski, which is assigned to the assignee of the present invention, there is disclosed a method of applying wire mesh over a fiberglass composite material to form an integral part of the surface of the fiberglass in order to dissipate airplane lightning strikes.

And, U.S. Pat. No. 4,671,470 by Jonas discloses a method for fastening aircraft wing spars and frame members to fiber reinforced composite structures using H-shaped woven strap connectors.

None of the above conventional methods are satisfactory for achieving electrical conductivity across a non conductive joint or gap between adjacent panels while at the same time electrically isolating the conductive panels from the underlying substructure in order to prevent galvanic corrosion.

SUMMARY OF THE INVENTION

In a first embodiment, the present invention pertains to a conductive system including a first part having an electrical conductor therein and a second part which is separate from the first part and which has an electrical conductor therein. The invention includes a bridge for conducting electrical energy between the first part and the second part. The bridge has an electrical conductor therein which has a plurality of peaks. In addition, this embodiment includes means for adhering the bridge to the first part and the second part such that the peaks of the bridge electrical conductor are in contact with the electrical conductor of the first part and the electrical conductor of the second part so as to provide a conductive path between them.

In a second embodiment, the present invention pertains to a method of providing a conductive path between adjacent parts. This involves positioning a first part adjacent to a second part such that there is a space between the first part and the second part, and exposing conductive portions of the first part and the second part. Further steps include providing a conductive workpiece having a plurality of peaks, and positioning the conductive workpiece against the first part and the second part such that the peaks of the conductive workpiece are in contact with the exposed conductive portions of the first part and the second part.

In addition, a liquid adhesive is applied to the conductive workpiece and the first part and the second part, and the conductive workpiece and the first part and the second part are compressed together such that excessive liquid adhesive between the conductive workpiece and the first part and the second part is caused to flow and escape through spaces beneath the peaks of the conductive workpiece while the adhesive cures.

There are a number of benefits of the present invention. Although not totally inclusive, some of these benefits include, providing an improved:

(i) continuous shield across joints or gaps against electromagnetic and other electrical disturbances;

(ii) conductive path or bridge across a gap between adjacent composite parts which are electrically conductive and which are insulated from an underlying frame to prevent galvanic corrosion;

(iii) conductive bridge which is fixed in contact with conductive portions of adjacent composite parts to provide a good conductive path there between;

(iv) conductive bridge which is lightweight and provides a good aerodynamic surface;

(v) conductive bridge which can withstand structural static and dynamic loads without degrading electromagnetic shielding performance; and (vi) conductive bridge for the purpose of improving high frequency coupler efficiency when the aircraft skin is used as a high frequency antenna.

BRIEF DESCRIPTION OF THE DRAWINGS

These and other objects and advantages of the present invention will be described in further detail in the following Detailed Description in conjunction with the attaching drawings, in which:

FIG. 5 is a perspective view of the conductive bridge in a later stage of preparation showing the attachment of an outer vacuum bag over the conductive mesh.

DETAILED DESCRIPTION

In an exemplary embodiment, the present invention will be described for use in providing an electromagnetic shield for the V-22 Osprey aircraft. However, it should be appreciated that the present invention is not limited for use in aircraft or in any particular aircraft type. Rather, the present invention may be used in any situation where a conductive bridge is needed between two adjacent conductive workpieces.

The V-22 Osprey is a fly-by-wire aircraft constructed of graphite composite skin over a mostly aluminum internal frame. It is a vertical take off and landing airplane having as one of its missions the transportation of shipboard marine personnel to and from land. The combination of the graphite/ aluminum construction and the salt spray environment in which the V-22 will be based necessitates exceptionally strict corrosion protection measures. These measures inherently isolate the conductive components of the aircraft.

In addition, the V-22 is an "all weather" weapons system that must be able to survive a lightning strike with minimal impact. This requires careful electromagnetic shielding of the aircraft's fly-by-wire flight control system. Furthermore, the V-22 must take off vertically. Therefore, to minimize weight, electromagnetic shielding using the aircraft's existing structure must be accomplished whenever possible. This requires electrical bonding between the conductive structural components. However, most of the time these components are required to be electrically isolated due to corrosion considerations.

Before discussing the details of the present invention; a short discussion of a conventional composite skin panel will be provided. It has been found that copper foil mesh embedded in epoxy resin provides the optimum combination of direct effects protection and indirect effects shielding while ensuring maintainability, durability, and aerodynamic surface smoothness, etc.

Figure 1:
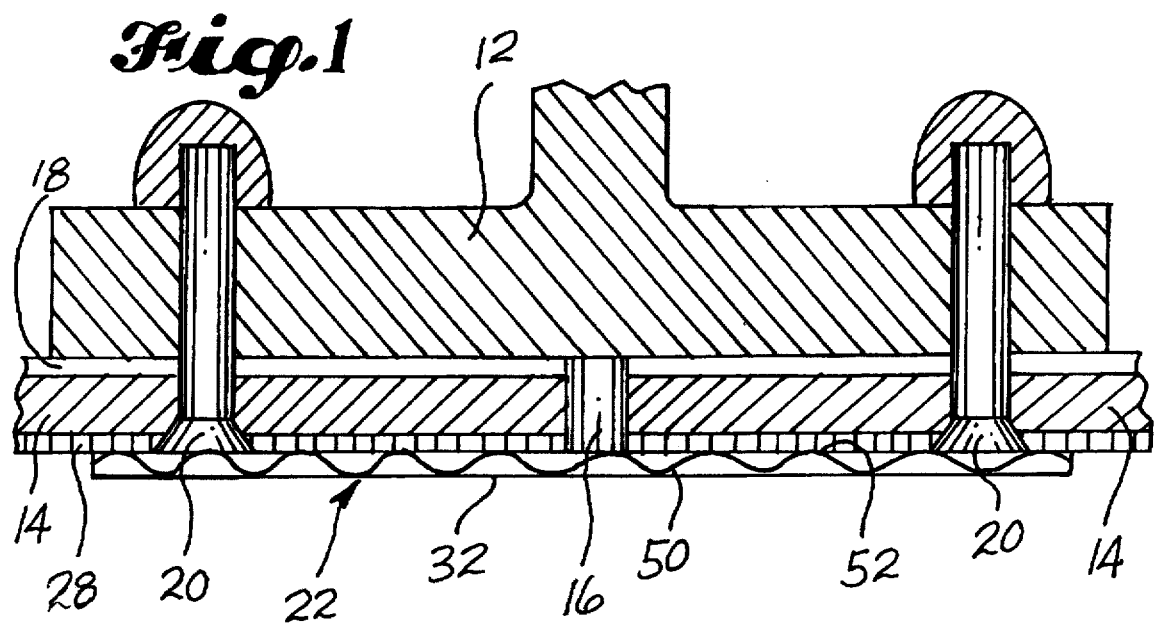
FIG. 1 is a cross section view of an airplane frame member which supports two adjacent composite aircraft skin panels wherein an exemplary conductive bridge of the present invention is employed.

Most of the internal frames in the forward and center sections of the V-22 aircraft are aluminum. A representative aluminum frame member 12, shown in cross section in FIG. 1, has attached thereto adjacent aircraft graphite epoxy skin panels 14 which are separated by a gap or joint 16. Due to the galvanic incompatibility of aluminum and graphite, these materials must be electrically isolated from each other in the event electrolytes (such as salt water) are present. Sealants and paint alone cannot sufficiently assure the exclusion of electrolytes from within these structurally critical joints. Therefore, it is necessary to use additional means to electrically isolate the graphite epoxy skins 14 from the aluminum frames 12.

This is accomplished by incorporating a thin ply of fiber glass 18 (FIG. 1) into the composite lay up on the frame side of the skin panels. In addition, the entire frame (including the side facing the graphite skin) is anodized, primed and painted. Finally, the frames 12 are attached to the skins 14 using K-coated titanium fasteners 20. K-coat is an aluminum-pigmented coating used on titanium fasteners to reduce galvanic corrosion when installed in aluminum. This coating is non-conductive.

The electrical conductivity across skin panel joints constructed in this manner is approximately 0.5 mhos per meter of joint length. This is unacceptable for electromagnetic shielding purposes.

The electromagnetic requirements which the V-22 skin panel must satisfy are: (i) conductivity across each panel joint of at least 200 mhos per meter (DC), (ii) the ability to conduct zone 3 lightning current with a peak of 200 kA divided by the local circumference of the aircraft without causing damage sufficient to require maintenance such that there is no impairment of the EMI shielding effectiveness, and (iii) a 200 KA lightning attachment to the joint must not cause loss of life or aircraft, and (iv) any form of lightning damage to the structure must be repairable at the "organization" level of maintenance.

Other design requirements for the non conductive gap or joint between adjacent skin panels include: (i) incorporation of the corrosion protection features outlined above, (ii) satisfying aerodynamic smoothness and discontinuity requirements, (iii) being manufacturable and repairable, (iv) withstanding maximum structural static and vibration loads without degrading electromagnetic shielding performance, and (v) keeping cost and weight to a minimum.

Figure 2:
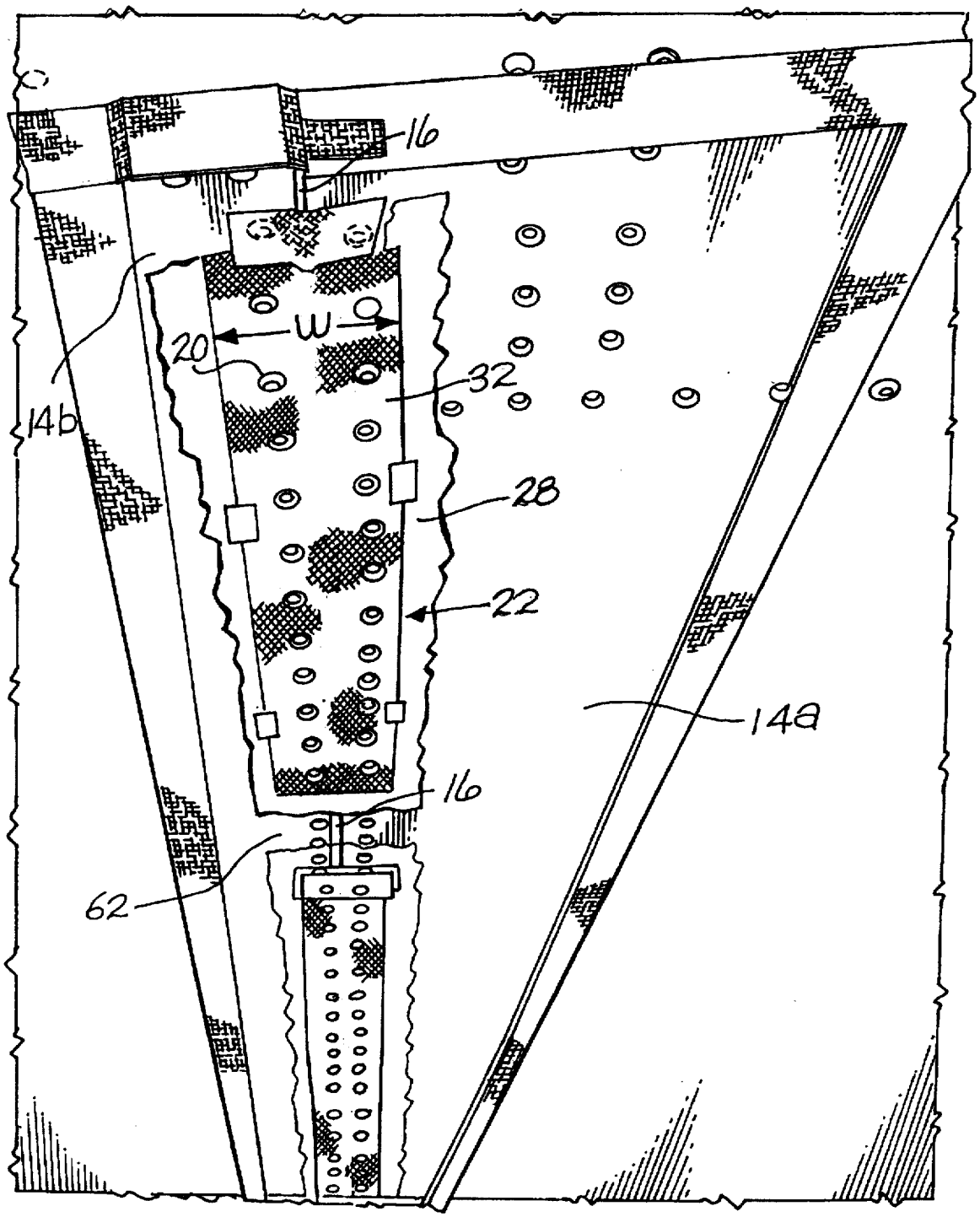
FIG. 2 is a perspective view of the conductive bridge in an early stage of preparation where a conductive mesh has been applied to adjacent composite aircraft skin panels.

In the typical graphite epoxy composite skin panel used in the V-22 and indicated at 14 in FIG. 2, the outermost layer of the composite lay-up is a thin copper mesh having a density of about 0.049 pounds per square foot. This mesh is pre-impregnated with a modified epoxy supported adhesive film and cocured with the structural graphite and resin matrix components. In an exemplary embodiment, the adhesive film is FM-300 manufactured by Cytec Industries located in Havre de Grace, Md.

The adhesive material is non-conductive and contains a non-conductive fiber glass "scrim" mat. During the cure cycle, the adhesive flows and envelops the copper mesh, totally encasing it in adhesive. After cure, the copper mesh is both physically and electrically isolated from the outer (air-flow side) of the skin panel by the cured adhesive as well as by the scrim mat. This is done purposefully to protect the thin copper mesh from mild impact damage and corrosion. This adhesive will partially electrically isolate the copper mesh from the underlying graphite.

Since the copper mesh is intended to provide lightning protection, the ideal electrical "bridge" between adjacent panels would provide a low resistance path between the copper mesh present in adjacent skin panels. Although electrical conduction between the graphite layers would be electrically sufficient for EMI shielding, such an electrical path may tend to see high damage when stressed by lightning currents. Thus, there is a preference for a copper mesh-to-copper mesh bridge rather than a graphite-to-graphite bridge.

Having described a conventional aircraft skin panel, attention now will be turned to the present invention. In order to form a bridge indicated at 22 (FIGS. 1 and 2) of the present invention, any non-conductive material which is present, such as epoxy adhesive, is removed from the surface of the air flow side of the skin panel 14. This is done near joint 16 between adjacent panels 14a and 14b in FIG. 2. In this manner, electromagnetic shielding material 28 embedded in the skin 14 is exposed. In an exemplary embodiment, the electromagnetic shielding material 28 is a lightweight (0.049 pounds per square foot) thin expanded copper mesh which has been rolled and flattened, and which is manufactured and sold under the product name "AstroStrike Screening" by the Astroseal Company of Old Saybrook, Conn.

The conductive portion of the bridge 22 uses a heavier weight (0.080 pounds per square foot) expanded copper mesh which has not been rolled flat after expansion. In an exemplary embodiment, the mesh 32 is formed by stamping a thin (5 mil) foil of high purity copper with a series of parallel overlapping slits. Once this is accomplished, the foil is expanded in a conventional manner by being pulled in opposite directions which are perpendicular to the lengthwise axes of the slits. The resultant pulling of the slits open (expanding) forms a somewhat diamond shaped mesh 32 shown in FIG. 3.

More specifically, the expanded mesh 32 includes diamond shaped openings 34 which are formed by perforating sheets of solid copper foil and then expanding the copper foil. Each opening 34 appears to be formed by two segments or "strands" of foil. These include (i) a first segment having an upper left portion 36 extending from a bend 38 in an upward and rightward direction (when viewing FIG. 3) where it joins with an upper right portion 40 at a bend 42 wherein the upper right portion 40 extends downward and rightward to a bend 44. The second segment of foil has a lower left portion 44 extending from a bend 46 in a downward and rightward direction where it joins with a lower right portion 48 at a bend 50 wherein the lower right portion 48 extends upward and rightward to a bend 52.

In addition, each opening 34 is formed (i) at the nine o'clock position by a bottom edge of segment bend 38 which is connected to a top edge of segment bend 46 along a connection joint 53, and (ii) at the three o'clock position by a bottom edge of segment bend 44 which is connected to a top edge of segment bend 52 along a connection joint 55. In addition, (i) at the twelve o'clock position a top edge of segment bend 42 is connected to a bottom edge of another segment bend 54 along a connection joint 57, and (ii) at the six o'clock position a bottom edge of segment bend 50 is connected to a top edge of another segment bend 56 along a connection joint 59.

Figure 3:
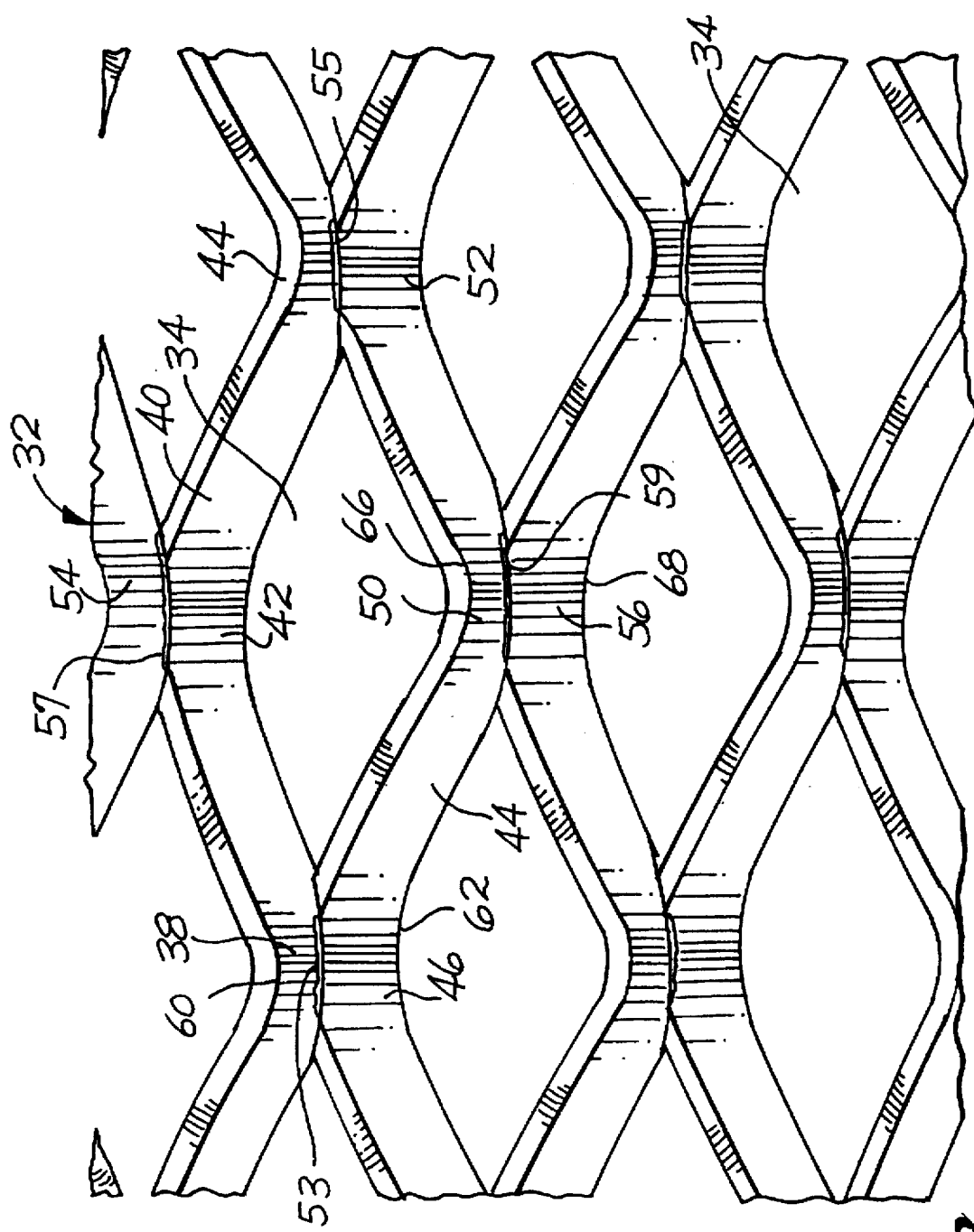
FIG. 3 is a top perspective view of the exemplary mesh for forming the conductive bridge of the present invention.
Figure 4:
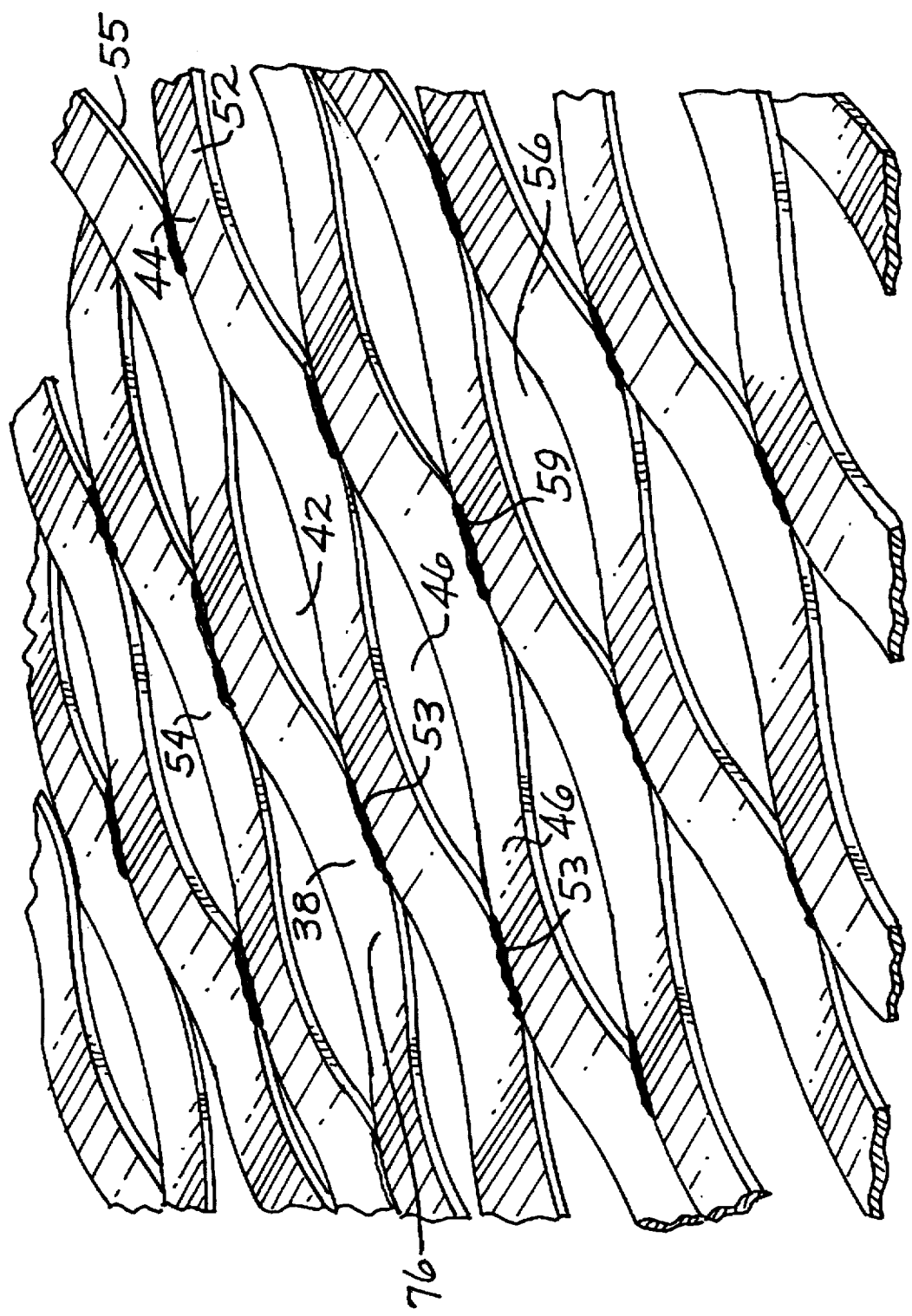
FIG. 4 is a somewhat side perspective view of the exemplary mesh.

As shown in FIGS. 3 and 4, the individual segments of foil mesh do not lie in the same plane. That is, during the expansion process discussed above, the foil mesh 32 is formed into different planes. For example, assuming there is a first imaginary horizontal plane extending through connection line 53 (nine o'clock position), a top edge or peak 60 of segment bend 38 is located the farthest distance above this first imaginary horizontal plane, whereas a bottom edge or peak 62 of the adjoining bend 46 is located the farthest distance below this first imaginary horizontal plane. Similarly, assuming there is a second imaginary horizontal plane through connection line 59 (six o'clock position), a top edge or peak 66 of segment bend 50 is located the farthest above this second imaginary horizontal plane, whereas a bottom edge or peak 68 of the adjoining segment bend 56 is located the farthest distance below this second imaginary horizontal plane. The resulting out of plane configuration of the foil mesh 32 creates a mesh of peaks 66, 68 extending from opposite sides of the mesh.

The heavier weight of the mesh 32 provides additional strength to the bowed peaks and causes them to resist compression (normal to the horizontal planes) during fabrication of the bridge 22. In an exemplary embodiment, the expanded copper mesh 32 has a density of about 0.08 pounds per square foot and is sold under the product name "AstroStrike Screening" by the Astroseal Company of Old Saybrook, Conn. After expansion, normally this expanded mesh is rolled flat. However, for the purposes of the present invention, the flattening process is deleted so that the mesh retains its out-of-plane configuration shown in FIGS. 3 and 4.

Continuing with a description of the process for making the conductive bridge 22, the conductive mesh 32 is taped over the joint 16 as shown in FIG. 2. It is preferable that the mesh 32 have a width dimension designated by the letter "w" in FIG. 2 of two inches or more in order to withstand the effects of a lightning strike.

In the present exemplary embodiment, it is desirable that the mesh have a width dimension of about three inches so that it extends laterally beyond fasteners 20. The edges of the mesh are bent downward using pliers or the like to prevent curling so the mesh lays flat against the surface of the panel.

In order to achieve the required conductivity, the maximum resistance across a joint 16 which is one meter in length is about five milliohms. It is not necessary that an entire joint 16 between two adjacent panels be covered by the bridge 22, however. Rather, as shown in FIG. 2, spaces 62 (between consecutive bridges 22) which are small in relation to the wavelengths of the EMI and lightning strike energy are permissible. Since these wavelengths are on the order of about ten meters, spaces 62 of no more than about one meter between consecutive bridges 22 are permissible.

After taping the mesh 32 to the panels 14a and 14b, an epoxy adhesive is brushed over the mesh in sufficient quantity that the entire mesh is covered with epoxy. The adhesive must be chemically compatible with the other materials used in the joint construction and is required to flow and envelop the conductive mesh 32 totally encasing it in resin. After cure, it is desirable that the conductive mesh be both physically and electrically isolated from the outer (air flow) side of the skin panel by the cured resin.

It is preferable that the epoxy adhesive have the following properties: (1) it must be strong enough to maintain a high pressure contact between the bridge mesh 32 and the panel mesh 28; (2) it should be non-conductive so as to minimize the amount of heating within the resin when a lightning current flows through the conductive mesh; and (3) it should be sufficiently non-porous to protect the exposed embedded wire mesh 32 from mild impact damage and corrosion. In an exemplary embodiment, the epoxy adhesive is Type EA 956 or EA 9396 manufactured by Hysol Corporation located in Pittsburgh, Calif.

Once the adhesive is applied, a Teflon® fabric parting film (not shown) is placed over the mesh 32. After this, a fiberglass bleeder fabric 69 (FIG. 5) is applied over the parting film. The parting film prevents the bleeder fabric 69 from sticking to the mesh during curing.

In order to provide a vacuum during curing, a nylon bag 70, which is attached via a tube 72 to a vacuum pump (not shown), is attached over the covered mesh 32 and secured to the panel by a conventional tape 74. Once this is accomplished, a vacuum of approximately twenty eight mm Hg is drawn for about twenty four hours to allow the adhesive to cure at room temperature.

While the adhesive is curing under vacuum, the peaks 66, 68 of the wire mesh 32 perform several valuable functions. First, the peaks contact the exposed mesh 28 of the panel 14 to make an electrical connection therewith. Also, during vacuum compression, the bridge mesh 32 is forced against the exposed panel mesh 28 causing any excess adhesive there between to be squeezed out. Beneath the peaks of the bridge mesh are open spaces 76 (FIG. 4) which provide paths for the adhesive to flow through. Without these paths for the adhesive to escape, there would be a tendency for the adhesive to prevent the peaks of the bridge mesh 32 from contacting the panel mesh 28 during vacuum compression thereby preventing proper electrical contact.

Thus, in the present process, the bridge mesh 32 remains in contact with the panel mesh 28 during the curing process. On the other hand, if a flat or compressible conventional mesh were used to form the bridge 22, the conventional mesh might float away from the panel mesh 28 during the cure cycle.

In another exemplary embodiment, the conductive bridge of the present invention is placed across a joint between a composite panel or skin (identical to the panel 14) and a panel made of aluminum (not shown). In order to provide conductivity between the composite panel and the aluminum panel, the aluminum panel is prepared by exposing a bare aluminum portion of this panel. Typically, this is accomplished by removing any primer or other surface protectant from the surface of the aluminum skin by a sanding operation. Once this is accomplished, a protective coating is applied to the bare aluminum surface to prevent oxidation and to prepare the surface for the application of the adhesive. In an exemplary embodiment, this coating is a chromate conversion coating formed by a chemical treatment of the aluminum in chemical solutions containing hexavalent chromium and goes by the name of Alodine.

After application of the protective coating, the aluminum surface is ready for the attachment of the bridge (identical to the bridge mesh 32) in the same manner discussed previously with regard to the attachment of the bridge mesh 32 to the exposed panel mesh 28. Furthermore, in this exemplary embodiment, the attachment of the bridge mesh to the composite panel is accomplished in the same manner as discussed previously with regard to the attachment of the bridge mesh 32 to the composite panel 14.

What is claimed is:

1. A conductive structure comprising:
   a. a first part having an electrical conductor;
   b. a second part which is separated by a gap from the first part and also has an electrical conductor;
   c. a bridge for conducting electrical energy across the gap between the electrical conductor of the first part and the electrical conductor of the second part, the bridge having an electrical conductor which has a plurality of electrically conductive peaks which have spaces thereunder; and
   d. an adhesive for attaching the bridge to the first part and such that the peaks of the bridge electrical conductor are in contact with the electrical conductor of the first part and the electrical conductor of the second part.

2. The conductive structure as set forth in claim 1 wherein:
   a. the adhesive is a liquid bonding material; and
   b. the spaces under the peaks of the bridge provide a path for the liquid bonding material to travel when the bridge is attached to the first part and the second part.

3. The conductive structure as set forth in claim 2 wherein:
   a. the bridge includes a mesh having a plurality of first and second intersecting strands; and b. the peaks are located at intersections of the first and second strands.

4. A conductive bridge across a gap between a first part having a conductive portion and a second part having a conductive portion, the conductive bridge comprising:

a. a conductive mesh for conducting electrical energy across the gap between the conductive portion of the first part and the conductive portion of the second part, the conductive mesh having an electrical conductor with a plurality of electrically conductive peaks which have spaces thereunder; and b. an adhesive for attaching the conductive workpiece to the first part and the second part across the gap such that the peaks of the conductive mesh are in contact with the conductive portion of the first part and the conductive portion of the second part and such that the spaces provide a path for the adhesive material to travel when the conductive mesh is attached to the first part and the second part.

* * * * *